Patented Mar. 23, 1948

2,438,326

UNITED STATES PATENT OFFICE 2,438,326

LACTIC ACID COMPOSITION

Herman H. Schopmeyer, Hammond, Ind., assignor to American Maize-Products Company, a corporation of Maine No Drawing. Application April 13, 1945, Serial No. 588,249

3 Claims. (Cl. 99—206)

This invention relates to a solid composition including normally liquid lactic acid. More particularly, the invention relates to evaporating to dryness a solution of lactic acid in starch conversion syrup, the evaporation involving less loss of lactic acid than normally accompanies the separation of water from lactic acid solutions by evaporation and producing a free flowing granular product.

Lactic acid is a desirable food acid. Also, it is available at a low price. There are many instances, however, in which citric, tartaric, and like acids are used in preference to lactic acid for the sole reason that they are solid, easily handled, and easily mixed into flour or other dry ingredients of foods.

A second problem arises in connection with the evaporation of lactic acid solutions even to concentrated liquid form. When the solutions are evaporated, in a usual type of vacuum evaporator, for instance, there is a substantial loss of lactic acid during such evaporation. This loss is to be expected in view of the known principles governing the proportion in which the dissolved material and water evaporate, in accordance with the vapor pressures of the two substances at the prevailing temperature.

The present invention provides not only a solidified lactic acid composition but also a convenient and economical method of making it.

Briefly stated, the invention comprises the concentration of lactic acid solutions by spray drying in the presence of the solid material of starch conversion syrup. The invention comprises also the resulting solidified product. In the preferred embodiment, the invention comprises the use of the lactic acid in proportion not in excess of that which dissolves in the syrup initially, remains dissolved in the starch conversion syrup during the evaporation, and also remains dissolved in the syrup solids obtained on cooling the dried, concentrated product.

With this method, there is obtained concentration of the lactic acid solution with a greatly reduced loss of lactic acid. In a typical run, the loss of lactic acid on spray drying in the presence of added corn syrup was only 2.6% of the total lactic acid used, as compared to a large and very costly loss of a fourth of the total lactic acid when the evaporation from the syrup solution was effected more slowly in vacuo. When the syrup is omitted, evaporation to solid form is not possible, even with a large loss of lactic acid.

Once this surprising result is observed, various theories may be advanced to explain it. Lactic acid and the sugars of corn syrup are each composed of the same elements C, H, and O. Dextrose, the principal sugar of the syrup, and lactic acid contain one or more hydroxyl groups and identical percentages of oxygen, carbon, and hydrogen, which further increases the similarity of constitution of the lactic acid and the sugars. It is further considered that, because of this similarity giving mutual solubility of the two materials in the proportions used by me, the solid material of the starch conversion syrup acts as a viscous fixative for the lactic acid and decreases the rate of diffusion of the lactic acid. Since evaporation from the droplets of the syrupy solution occurs only at the surface and since the rate of diffusion of lactic acid to the surface is retarded, evaporation of lactic acid during the momentary period of spray drying is reduced to a figure below that normally obtained in the evaporation of solutions of lactic acid and water.

In effecting the evaporation, the moisture content is lowered to that permitting the solution as finally concentrated to solidify when cooled to room temperature. Thus I evaporate to a moisture content between about 1% and 4% and suitably to 3% or less.

The effect of the syrup solids in retarding evaporation of the lactic acid will be illustrated in greater detail by the following specific example.

Lactic acid in the proportion of 5 parts was dissolved in corn syrup (on the dry basis) of density 43° Bé. containing 95 parts of solids of reducing sugars content calculated as dextrose of 42.5%. The resulting solution of the lactic acid in the syrup was preheated to 240° F. in a heat exchanger delivering the heated solution directly and quickly to the atomizer of a spray drier. The preheated syrup was then atomized into a chamber of hot air at an air temperature of 320° F., the air being contained in and passing through a large cyclonic collector of usual type for spray dried material. The air discharged from the cyclone or drying chamber was at a temperature of 190° F.

A dried, solidified composition containing the solid material of the original starch conversion syrup and the lactic acid was delivered from the drying chamber at a temperature of about 110° to 120° F. and a moisture content of 2.7%. The free acid content of this product was 4.87%. It is considered that the temperature of the material being dried during any stage of the drying was always below 160° F. The lactic acid recovered was, therefore $$\frac{4.87}{0.973}$$

or 5 parts of lactic acid, to within the limit of accuracy of the analyses.

In another run that was comparable except for the method of evaporation, the solution containing 5 parts of lactic acid to 95 parts of syrup solids in the form of the syrup of kind described was evaporated in a vacuum evaporator under 24 inches of vacuum. By the time the moisture content was reduced to 3.7% in the concentrated product, the remaining acidity was only 3.6%. The recovery of lactic acid was, therefore, $$\frac{3.6}{0.963}$$

or 3.74 parts. The loss of lactic acid corresponds to 5—3.74 or 1.26 parts, which is approximately 25% of the lactic acid originally used.

As the starch conversion syrup to be used in connection with the solidification of lactic acid as described, there may be used the conversion syrup made by the conversion of corn, potato, wheat or like starch. The concentration at which the syrup and lactic acid solution are sprayed is ordinarily about as high as may be handled conveniently in the spray drying equipment, particularly in the atomizer. Thus, there may be used to advantage starch conversion syrup of density 35° to 45° Bé. as the base in which the lactic acid is dissolved or supplied to the atomizer. When the density of the syrup is too low, then the evaporation load on the spray drier is necessarily large. When the syrup density is substantially above 45°, the solution is too viscous for best handling or atomizing for spray drying.

The degree of conversion of the syrup used may vary considerably. For most results, however, I prefer to have the degree of conversion relatively high, as high conversion decreases the viscosity for a given concentration and makes possible the use of a more concentrated syrup at the spraying stage than would be the case with a low degree of conversion of the starch. The range of degrees of conversion that may be used are 25 to 55 parts of reducing sugars calculated as dextrose for 100 parts of the syrup solids. Ordinarily I use syrups of D. E. 40% to 50%. Such syrups contain a substantial proportion of dextrin.

The solidified lactic acid composition made as described is a free flowing powder that may be incorporated readily into various compositions and recipes. It may be stored and shipped in bags of the kind now used for the distribution of spray dried corn syrup solids.

The product of the invention is useful as a food product and particularly in the very large class of compositions which require both a sweetening agent and lactic acid. The granular form facilitates uniform mixing into flour or the like.

The lactic acid is not only soluble in the syrup before and at the time of atomization and evaporation but, in the proportion used by me, it is soluble also in the finished solidified composition. Thus, I have used from 1 to 10% of lactic acid with sufficient syrup to give 100 parts of the spray dried composition including the lactic acid and the solid material of the starch conversion syrup. When substantially larger amounts of lactic acid are used as, for instance, 20 parts of lactic acid to 80 of the syrup solids, then the syrup solids dissolve in the lactic acid at the temperature of spraying so that the whole mixture becomes either sticky or a viscous solution. This solution once formed with such a proportion of lactic acid does not solidify on cooling.

The existence of the lactic acid in solution in the solid material of the syrup solids causes the composition to have the general appearance and free flowing characteristics of the syrup solids as made by spray drying syrup without any admixture. The existence of the solution also makes certain that, when the solidified composition is mixed with other ingredients, the distribution of the lactic acid is no more difficult and no less complete and uniform than that of the syrup solids themselves.

It will be understood also that it is intended to cover all changes and modifications of the example of the invention herein chosen for the purpose of illustration which do not constitute departures from the spirit and scope of the invention.

What I claim is:

1. In forming a solidified composition including lactic acid, the method which comprises forming a solution of lactic acid in starch conversion syrup, spray drying the solution in heated air to a water content not above 4% of the weight of dry product, and then cooling the product to room temperature, the lactic acid being used in proportion not in excess of that which is soluble in the syrup and in the solids derived therefrom, at all temperatures of evaporation and subsequent cooling.

2. In forming a solidified composition including lactic acid, the method which comprises forming a solution of lactic acid in starch conversion syrup, spray drying the solution at an elevated temperature below a maximum of 160° F. in the solution, to a water content not above 4% that causes the concentrated solution to solidify on cooling to room temperature, and then cooling the product to room temperature, the proportion of lactic acid used being substantial but not in excess of 10 parts to 90 parts of the solid material of the syrup.

3. The method described in claim 1, the syrup used being of concentration corresponding to a density 35° to 45° Bé. and the solids in the syrup having a reducing sugars content calculated as dextrose of 25 to 55 per cent.

HERMAN H. SCHOPMEYER.

REFERENCES CITED

The following references are of record in the file of this patent:

UNITED STATES PATENTS

| Number | Name | Date |
|---|---|---|
| 1,361,239 | Fleming | Dec. 7, 1920 |
| 1,537,060 | Beardslee | May 12, 1925 |
| 1,686,703 | Leo | Oct. 9, 1928 |
| 1,771,342 | McCallum | July 22, 1930 |
| 2,071,841 | Kelling | Feb. 23, 1937 |
| 2,149,517 | Fleming | Mar. 7, 1939 |
| 2,324,113 | Schopmeyer | July 13, 1943 |
| 2,367,789 | Leo | Jan. 23, 1945 |